United States Patent Office 3,290,332
Patented Dec. 6, 1966

3,290,332
6,7-DIHYDROINDOLES AND DERIVATIVES THEREOF
William Alan Remers, Suffern, N.Y., and Martin Joseph Weiss, Oradell, N.J., assignors to American Cyanamid Company, Stamford, Conn., a corporation of Maine
No Drawing. Filed Aug. 30, 1965, Ser. No. 483,851
15 Claims. (Cl. 260—326.12)

This invention relates to new organic compounds. More particularly, it relates to substituted 6,7-dihydroindoles and methods of preparing the same.

The novel dihydroindoles may be illustrated by the following formula:

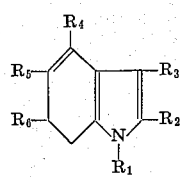

wherein $R_1$ is a member of the group consisting of hydrogen, lower alkyl, benzyl and benzenesulfonyl; $R_2$ is a member of the group consisting of hydrogen, formyl and lower alkyl; $R_3$ is a member of the group consisting of hydrogen and formyl; $R_4$ is a member of the group consisting of lower alkyl, halogen, lower alkyloxy and diloweralkylamino; $R_5$ is a member of the group consisting of hydrogen, formyl and lower alkyl aldimine, and $R_6$ is a member of the group consisting of hydrogen and lower alkyl.

The compounds of this invention are, in general, white or yellow crystalline compounds, substantially insoluble in water and soluble in the usual organic solvents.

The present compounds can be prepared for example by the specific and generic methods illustrated by the following equations:

Flowsheet

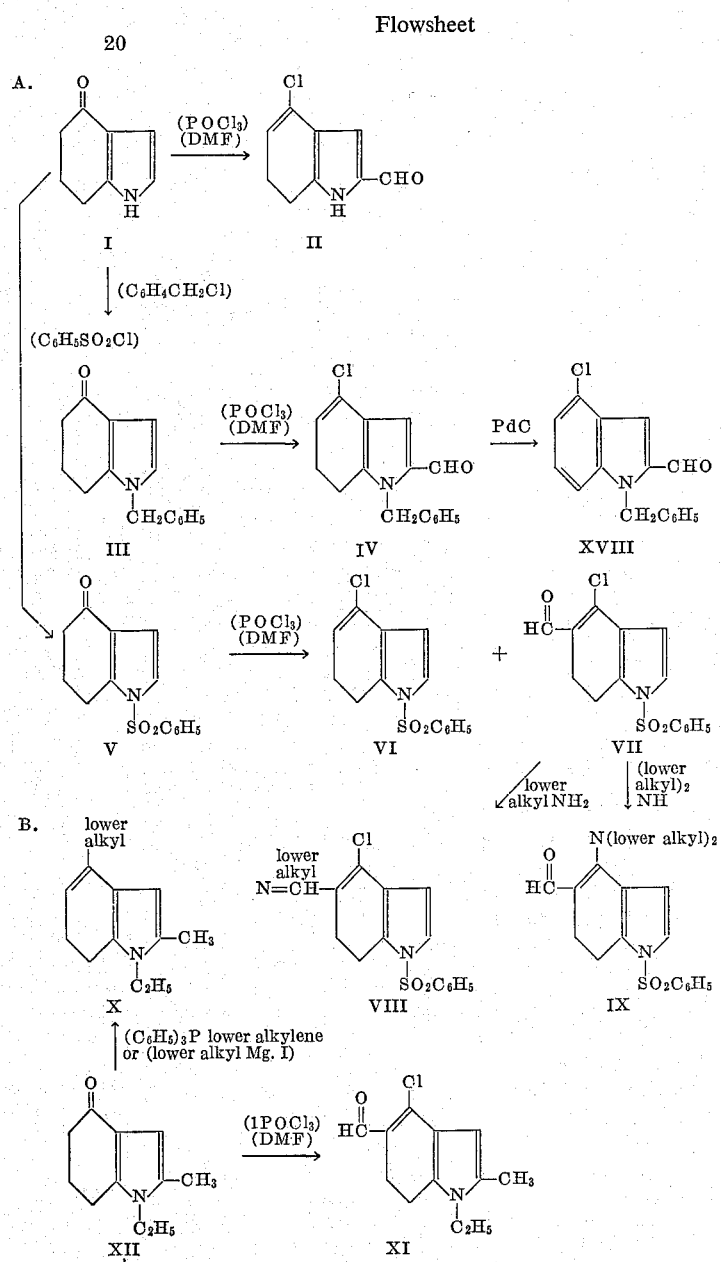

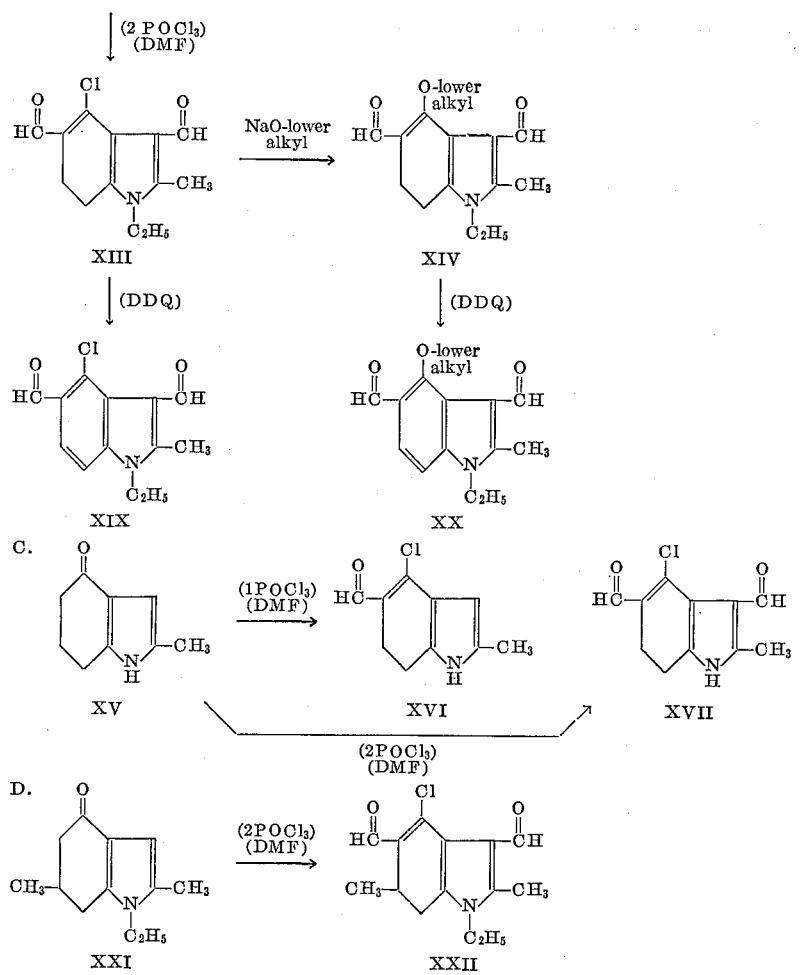

Thus treatment of 2-unsubstituted-4-oxo-4,5,6,7-tetrahydroindoles with hydrogen, lower alkyl or benzyl substituents on N–1 such as (I) and (III) with phosphorous oxychloride in dimethylformamide produces the corresponding 4-chloro-2-formyl-6,7-dihydroindoles, (II) and (IV), respectively. When the 2-unsubstituted-4-oxo-4,5,6,7-tetrahydroindoles have a benzenesulfonyl group on N–1 such as (V), a mixture of the corresponding 4-chloro (VI) and 4-chloro-5-formyl (VII) 6,7-dihydroindoles is formed under these conditions. The 4-chlorine of a 4-chloro-5-formyl-6,7-dihydroindole such as (VII) can be displaced by dialkylamino groups to give the corresponding 4 - dialkylamino - 6,7 - dihydroindole (IX). However monoalkylamines convert (VII) to the corresponding alkimines (VIII).

When a 1,2-diloweralkyl-4-oxo-4,5,6,7 - tetrahydroindole such as (XII) is treated with a triphenylalkylenephosphorane such as triphenylmethylenephosphorane or a lower alkyl magnesium halide such as methylmagnesium iodide the corresponding 4-lower alkyl-6,7-dihydroindole (X) is produced. With one equivalent of phosphorous oxychloride in dimethylformamide 2-lower alkyl-4-oxo-4,5,6,7-tetrahydroindoles such as (XII) and (XV) are converted to 4-chloro-5-formyl-6,7-dihydroindoles such as (XI) and (XVI) whereas treatment of (XII), and (XV) and (XXI) with two equivalents of phosphorous oxychloride in dimethylformamide gives the corresponding 4 - chloro-3,5-diformyl - 6,7 - dihydroindoles such as (XIII), (XVII) and (XXII). The 4-chlorine of (XIII) is displaced by a lower alkoxide such as methoxide to give a corresponding 4-lower alkoxy-3,5-diformyl-6,7-dihydroindole such as (XIV).

A 6,7-dihydroindole-2-carboxaldehyde such as (IV) is dehydrogenated by palladium-on-charcoal in cumene to the corresponding indole-2-carboxaldehyde (XVIII), and 6,7-dihydroindole-3,5-dicarboxaldehydes such as (XIII) and (XIV) are dehydrogenated by dichlorodicyanobenzoquinone in dioxane to the corresponding indole-3,5-dicarboxaldehydes (XIX) and (XX).

The compounds of this invention shown in vitro antifungal activity against Trichophyton mentagrophytes E–11, Microsporum gypseum E–28, and Chaetomium globosum H–71 and therefore are useful as anti-fungal agents. The compounds are potentially useful for topical application as fungicides.

The following examples illustrate in greater particularity the preparation of representative substituted 6,7-dihydroindoles of the present invention.

*Example 1.—Preparation of 4-chloro-6,7-dihydro-2-indolecarboxaldehyde*

A solution of 1.35 g. of 4-oxo-4,5,6,7-tetrahydroindole (H. Stetter and R. Lauterbach, Ann., 655, 20 [1962]) in 14 ml. of dimethylformamide is added to an ice-cooled solution of 0.93 ml. of phosphorous oxychloride in dimethylformamide. The mixture is heated on a steam bath for 90 minutes, cooled and poured into sodium bicarbonate solution containing ice. A methylene chloride extract of the mixture is washed with water, dried and concentrated and the residue is purified by adsorption chromatograph on magnesia-silica gel with methylene chloride as eluant. This procedure gives brown needles that decompose without melting when heated; λ max 293, 329 mμ.

*Example 2.—Preparation of 1-benzyl-4-oxo-4,5,6,7-tetrahydroindole*

A mixture of 12.7 g. of potassium-t-butoxide, 15.3 g. of 4-oxo-4,5,6,7-tetrahydroindole (H. Stetter and R. Lauterbach, Ann., 655, 20 [1962]) and 100 ml. of benzene is heated at reflux temperature for 2 hours, cooled, and treated with a solution of 14.5 g. of benzyl chloride in 50 ml. of benzene. The mixture is stirred overnight at room temperature, treated with water, and the organic layer is separated, washed with water and concentrated, giving 14.2 g. of white prisms, melting point 80°–81.5° C.

*Example 3.—Preparation of 1-benzyl-4-chloro-6,7-dihydro-2-indolecarboxaldehyde*

To an ice-cooled mixture 12.2 g. of phosphorous oxychloride and 30 ml. of dimethylformamide is added a solution of 9.0 g. of 1-benzyl-4-oxo-4,5,6,7-tetrahydroindole (Example 2) in 30 ml. of dimethylformamide. The mixture is heated on a steam bath for 1 hour, cooled, and poured into ice water. Sodium hydroxide solution is added until the distinct alkalinity is obtained and the mixture is then extracted with methylene chloride. This extract is washed two times with water, dried, and concentrated. Recrystallization of the residue from ether gives 6.71 g. of white crystals, melting point 110°–114° C.

*Example 4.—Preparation of 1-benzenesulfonyl-4-oxo-4,5,6,7-tetrahydroindole*

A mixture of 5.6 g. of potassium-t-butoxide, 6.25 g. of 4-oxo-4,5,6,7-tetrahydroindole (H. Stetter and R. Lauterbach, Ann., 655, 20 [1962]), and 200 ml. of benzene is heated at reflux temperature for 2 hours, cooled, and treated with a solution of 8.83 g. of benzenesulfonyl chloride in 20 ml. of benzene. The mixture is stirred 16 hours at room temperature and treated with water. The organic layer is washed with 2% sodium bicarbonate solution, dried and concentrated. Recrystallization of the residue from methanol gives 5.12 g. of white rods, melting point 117°–118.5° C.

*Example 5.—Preparation of 1-benzenesulfonyl-4-chloro-6,7-dihydroindole and 1-benzenesulfonyl-4-chloro-6,7-dihydro-5-indolecarboxaldehyde*

To an ice-cooled mixture of 565 mg. of phosphorous oxychloride and 3 ml. of dimethylformamide is added a solution of 1.02 g. of 1-benzenesulfonyl-4-oxo-4,5,6,7-tetrahydroindole (Example 4) in 6 ml. of dimethylformamide. The mixture is heated at steam-bath temperature for 1 hour, cooled, and poured into ice water. The gummy solid that separates is dissolved in methylene chloride and this solution is washed with water, dried, and concentrated. Resolution of the residual mixture by partition chromatography affords 1-benzenesulfonyl-4-chloro-6,7-dihydroindole as white solid and 1-benzenesulfonyl-4-chloro-6,7-dihydro-5-indolecarboxaldehyde as white solid, melting point 150°–154° C.

*Example 6.—Preparation of 1-ethyl-2-methyl-4-oxo-4,5,6,7-tetrahydroindole*

A mixture of 33 g. of 2-acetonyl-1,3-cyclohexanedione (H. Stetter and R. Lauterbach, Ann., 655, 20 [1962]) 20 g. of anhydrous ethylamine and 135 ml. of methanol is heated in a steel bomb for 12 hours at 150° C. The cooled mixture is concentrated and the residue is treated with water and methylene chloride. After the organic layer is washed two times with 5% sodium hydroxide solution, it is dried and concentrated and the residue is crystallized from cyclohexane. The procedure affords 18.8 g. of white crystals, melting point 74°–75° C.

*Example 7.—Preparation of 6,7-dihydro-2,4-dimethyl-1-ethylindole*

To a suspension of 9.40 g. of methyltriphenylphosphonium bromide in 80 ml. of hexane is added 2.8 g. of potassium-t-butoxide. This mixture is stirred 30 minutes and treated with a suspension of 1-ethyl-2-methyl-4-oxo-4,5,6,7-tetrahydroindole (Example 6) in 10 ml. of ether. The mixture is stirred 16 hours, poured into water, and the organic layer is separated. The aqueous layer is extracted with methylene chloride and the combined organic layers are dried and concentrated. A benzene solution of the residue is passed through a silica gel column. Concentration of the eluate (50 ml.) affords 620 mg. of an amber oil that has λ max 231, 270 mμ, 12.9 μ.

*Example 8.—Preparation of 4-chloro-6,7-dihydro-1-ethyl-2-methyl-5-indolecarboxaldehyde*

To an ice-cooled mixture of 1.53 g. of phosphorous oxychloride and 6 ml. of dimethylformamide is added a solution of 1.77 g. of 1-ethyl-2-methyl-4-oxo - 4,5,6,7-tetrahydroindole (Example 6) in 15 ml. of dimethylformamide. The mixture is heated on a steam bath for 1 hour, cooled and poured into ice water. Sodium hydroxide solution (10%) is added until no further precipitation occurs, then the mixture is extracted with methylene chloride. The extract is washed with sodium bicarbonate solution and water, dried and concentrated to 10 ml. Chromatography of this concentrate on a column of magnesia-silica gel (24 times 195 mm.) with methylene chloride as eluant gives a yellow eluate (500 ml.) that produces a yellow oil on concentration. Trituration of this oil with ether gives yellow plates, melting point 100°–107° C.

*Example 9.—Preparation of 4-chloro-6,7-dihydro-1-ethyl-2-methyl-3,5-indoledicarboxaldehyde*

To an ice-cooled mixture of 12.24 g. of phosphorous oxychloride and 60 ml. of dimethylformamide is added a solution of 7.08 g. of 1-ethyl-2-methyl - 4 - oxo-4,5,6,7-tetrahydroindole (Example 6) in 60 ml. of dimethylformamide. The mixture is heated on a steam bath for 1 hour, then cooled and poured into a mixture of ice and 5% sodium bicarbonate solution. The clear solution that forms is treated with 10% sodium carbonate solution until no further precipitation occurs. A methylene chloride extract of the mixture is washed with brine, dried and concentrated and the dark residue is purified by chromatography on magnesia-silica gel with methylene chloride as eluant. Concentration of the yellow eluate affords an oil that solidifies on treatment with ether. Crystallization of this solid from methanol gives 1.83 g. of yellow plates, melting point 124°–134° C.

*Example 10.—Preparation of 6,7-dihydro-1-ethyl-4-methoxy-2-methyl-3,5 indoledicarboxaldehyde*

A solution of 300 mg. of 4-chloro-6,7-dihydro-1-ethyl-2-methyl-3,5-indoledicarboxaldehyde (Example 9) in 10 ml. of methanol is treated with a solution of 84 mg. of sodium methoxide in 5 ml. of methanol. After 3 days the mixture is concentrated and the residue is treated with methylene chloride and water. The organic layer is washed with water, dried and concentrated and the residue, which crystallizes on treatment with ether, is recrystallized from methanol. The procedure gives 6,7-dihydro - 1 - ethyl - 4 - methoxy - 2 - methyl - 3,5-indoledicarboxaldehyde as white plates, melting point 110°–120° C.

*Example 11.—Preparation of 4-chloro-6,7-dihydro-2-methyl-5-indolecarboxaldehyde*

Treatment of 2 - methyl-4-oxo-4,5,6,7-tetrahydroindole (H. Stetter and R. Lauterbach, Ann., 655, 20 [1962]) by the procedure described in Example 8 affords yellow prisms melting point 122°–124° C.

*Example 12.—Preparation of 4-chloro-6,7-dihydro-2-methyl-3,5-indoledicarboxaldehyde*

Treatment of 2-methyl-4-oxo-4,5,6,7-tetrahydroindole (H. Stetter and R. Lauterbach, Ann., 655, 20 [1962]) by the procedure described in Example 9 gives yellow plates that decompose without melting above 180° C.

*Example 13.—Preparation of 1-benzenesulfonyl-4-chloro-6,7-dihydro-5-indolecarboxaldehyde, methylimine (VIII)*

A solution of 324 mg. of 1-benzenesulfonyl-4-chloro-6,7-dihydro-5-indolecarboxaldehyde (Example 5) in 15 ml. of methanol is treated with excess methylamine. After two days the mixture is concentrated and the residue is crystallized from ethylene chloride-hexane. This procedure gives pale yellow prisms, melting point 158°–159° C.

*Example 14.—Preparation of 1 - benzenesulfonyl - 4-dimethylamino-6,7-dihydro-5-indolecarboxaldehyde (IX)*

A solution of 324 mg. of 1-benzenesulfonyl 4-chloro-6,7-dihydro-5-indolecarboxaldehyde (Example 5) in 20 ml. of tetrahydrofuran is treated with excess dimethylamine. After 20 hours the mixture is filtered and the filtrate is washed with water, dried, and concentrated. The residue is crystallized from ether and recrystallized two times from methylene chloride-hexane. The procedure gives yellow prisms, melting point 138°–139° C.

*Example 15.—Preparation of 4-chloro-1-ethyl-2-methyl-3,5-indoledicarboxaldehyde (XIX)*

A solution of 461 mg. of 4-chloro-6,7-dihydro-1-ethyl-2-methyl-3,5-indoledicarboxaldehyde (Example 9) in 10 ml. of dioxane is treated with a solution of 510 mg. of dichlorodicyanobenzoquinone of 3 ml. of dioxane. After 16 hours the mixture is filtered and the filtrate is concentrated. The residue is crystallized from ether and recrystallized from methylene chloride-hexane. This procedure gives white needles, melting point 160° C.

*Example 16.—Preparation of 1-ethyl-4-methoxy-2-methyl-3,5-indoledicarboxaldehyde (XX)*

Treatment of 6,7-dihydro-1-ethyl-4-methoxy-2-methyl-3,5-indoledicarboxaldehyde (Example 10) by the procedure described in Example 15 gives white prisms, melting point 187°–190° C.

*Example 17.—Preparation of 1-benzyl-4-chloro-2-indolecarboxaldehyde (XVIII)*

A mixture of 400 mg. of 1-benzyl-4-chloro-6,7-dihydro-3-indolecarboxaldehyde (Example 3), 100 mg. of dichlorodicyanobenzoquinone, and 10 ml. of dioxane is kept at room temperature for 30 minutes, filtered, and the filtrate is concentrated. The residue is extracted with ether-hexane. Concentration of this extract gives pale yellow prisms, melting point 93–96° C.

*Example 18.—Preparation of 2,6-dimethyl-1-ethyl-4-oxo-4,5,6,7-tetrahydroindole*

In the manner described in Example 6 treatment of 2-acetonyl-5-methyl-1,3-cyclohexanedione (H. Stetter and R. Lauterbach, Ann. 655, 20 [1962]) with ethylamine gives white needles, melting point 77°–79° C.

*Example 19.—Preparation of 4-chloro-6,7 - dihydro-2,6-dimethyl-1-ethyl-3,5-indoledicarboxaldehyde*

In the manner described in Example 9 treatment of 2,6-dimethyl-1-ethyl-4-oxo-4,5,6,7 - tetrahydroindole (Example 18) with phosphorous oxychloride and dimethylformamide gives yellow plates, melting point 120°–122° C.

We claim:
1. A dihydroindole of the formula:

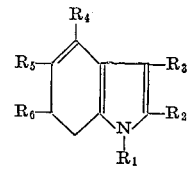

wherein $R_1$ is a member selected from the group consisting of hydrogen, lower alkyl, benzyl and benzenesulfonyl; $R_2$ is a member selected from the group consisting of hydrogen, formyl, and lower alkyl; $R_3$ is a member selected from the group consisting of hydrogen and formyl; $R_4$ is a member selected from the group consisting of lower alkyl, halogen, lower alkyloxy and diloweralkylamino; $R_5$ is a member selected from the group consisting of hydrogen, formyl, and lower alkyl aldimine and $R_6$ is a member selected from the group consisting of hydrogen and lower alkyl.

2. The compound 4-chloro - 6,7 - dihydro-2-indolecarboxaldehyde.

3. The compound 1-benzyl - 4 - chloro-6,7-dihydro-2-indolecarboxaldehyde.

4. The compound 1-benzenesulfonyl - 4 - chloro-6,7-dihydroindole.

5. The compound 1-benzenesulfonyl - 4 - chloro-6,7-dihydro-5-indolecarboxaldehyde.

6. The compound 1 - benzenesulfonyl - 4 - dimethylamino-6,7-dihydro-5-indolecarboxaldehyde.

7. The compound 6,7-dihydro-2,4-dimethyl - 1 - ethylindole.

8. The compound 4-chloro-6,7-dihydro - 1 - ethyl-2-methyl-5-indolecarboxaldehyde.

9. The compound 6,7-dihydro - 1 - ethyl - 4 - methoxy-2-methyl-3,5-indoledicarboxaldehyde.

10. The compound 4-chloro-6,7-dihydro-1-ethyl - 2 - methyl-3,5-indoledicarboxaldehyde.

11. The compound 4-chloro-6,7 - dihydro - 2 - methyl-5-indolecarboxaldehyde.

12. The compound 4-chloro-6,7-dihydro - 2 - methyl-3,5-indoledicarboxaldehyde.

13. The compound 1-benzyl-4-chloro - 2 - indolecarboxaldehyde.

14. The compound 4-chloro-1-ethyl - 2 - methyl-3,5-indoledicarboxaldehyde.

15. The compound 1-ethyl-4-methoxy - 2 - methyl-3,5-indoledicarboxaldehyde.

No references cited.

ALEX MAZEL, *Primary Examiner.*

M. O'BRIEN, *Assistant Examiner.*